(12) United States Patent
Griffin (10) Patent No.: US 12,505,586 B2
(45) Date of Patent: Dec. 23, 2025

(54) GENERATING TOP VIEW OF VEHICLE WITH IMAGE HARMONIZATION BASED ON OBJECT DETECTION

(71) Applicant: Connaught Electronics Ltd., Tuam (IE)

(72) Inventor: Mark Patrick Griffin, Troy, MI (US)

(73) Assignee: Connaught Electronics Ltd. (IE)

( * ) Notice: Subject to any disclaimer, the term of this patent is extended or adjusted under 35 U.S.C. 154(b) by 351 days.

(21) Appl. No.: 18/126,639

(22) Filed: Mar. 27, 2023

(65) Prior Publication Data

US 2024/0331209 A1     Oct. 3, 2024

(51) Int. Cl.
| | |
|---|---|
| *G06K 9/00* | (2022.01) |
| *B60R 1/23* | (2022.01) |
| *G06T 7/10* | (2017.01) |
| *G06T 7/70* | (2017.01) |
| *G06T 11/00* | (2006.01) |

(52) U.S. Cl.
CPC ............... *G06T 11/00* (2013.01); *B60R 1/23* (2022.01); *G06T 7/10* (2017.01); *G06T 7/70* (2017.01); *B60R 2300/105* (2013.01); *B60R 2300/303* (2013.01); *G06T 2207/30252* (2013.01)

(58) Field of Classification Search
CPC ............... B60R 1/23; B60R 2300/105; B60R 2300/303; G06T 11/00; G06T 2207/20021; G06T 2207/30252; G06T 2207/30261; G06T 2207/30264; G06T 5/94;

(Continued)

(56) References Cited

U.S. PATENT DOCUMENTS

| | | |
|---|---|---|
| 8,310,571 B2 | 11/2012 | Koishi |
| 8,380,367 B2 | 2/2013 | Schultz et al. |

(Continued)

FOREIGN PATENT DOCUMENTS

| | | |
|---|---|---|
| DE | 102016121755 A1 | 5/2018 |
| DE | 102018110597 A1 | 11/2019 |

(Continued)

OTHER PUBLICATIONS

International Search Report and Written Opinion for PCT/US2024/019907, Search Completed on Jun. 27, 2024, All together 10 Pages.

*Primary Examiner* — Duy M Dang
(74) *Attorney, Agent, or Firm* — Dickinson Wright PLLC (57) ABSTRACT

A composite top view of an area surrounding a vehicle is generated utilizing image harmonization and proximity sensor data. Images from various vehicle cameras are received, wherein at least two of the cameras can see the same portion of the environment in an overlapping region. The images are segmented into segments. The overlapping regions include some of the segments of one image and some of the segments of another region to define overlapping segments. Sensor data is received from a plurality of proximity sensors, wherein the sensor data indicates a location of an object outside of the vehicle. The color and/or brightness of the images are harmonized based at least in part on the sensor data. In particular embodiments, weights are placed on the color and/or brightness of the overlapping segments associated with the location of the object. Or these overlapping segments can be removed from the harmonization.

20 Claims, 8 Drawing Sheets

(58) Field of Classification Search
CPC .... G06T 7/10; G06T 7/70; G06T 7/90; G06T 3/4038; G06V 10/16
See application file for complete search history.

(56) References Cited

U.S. PATENT DOCUMENTS

| | | | |
|---|---|---|---|
| 2011/0234801 A1* | 9/2011 | Yamada | H04N 23/90 348/148 |
| 2019/0325580 A1 | 10/2019 | Lukac et al. | |
| 2022/0327793 A1 | 10/2022 | Okonogi et al. | |

FOREIGN PATENT DOCUMENTS

| | | |
|---|---|---|
| DE | 102018113281 A1 | 12/2019 |
| DE | 102018118996 A1 | 2/2020 |
| WO | 2018087348 A1 | 5/2018 |

* cited by examiner

GENERATING TOP VIEW OF VEHICLE WITH IMAGE HARMONIZATION BASED ON OBJECT DETECTION

TECHNICAL FIELD

The present disclosure relates to methods and systems for generating composite images of an environment outside of a motor vehicle, utilizing harmonization techniques that are based on detected objects outside of the motor vehicle.

BACKGROUND

To assist with parking or maneuvering during slow speeds, vehicles can be equipped with the ability to generate a top view on the vehicle display (e.g., infotainment screen). The top view, also referred to as a top-down view, an above view, or a bird's view, is generated by stitching together images from various cameras located about the vehicle. The images are processed, analyzed and stitched together to offer a synthetic but positionally accurate top view of the vehicle and its 360-degree surroundings; it appears to the driver as if a single image is taken of the vehicle and its surroundings from directly above the vehicle.

SUMMARY

According to one embodiment a method for generating a top view of an area surrounding a vehicle is provided. The method includes: receiving images from a plurality of vehicle cameras, wherein each vehicle camera is configured to view a respective region outside of the vehicle, and wherein portions of some of the regions overlap with portions of other regions to define overlapping regions; segmenting each image into a respective plurality of segments, wherein the overlapping regions include some of the segments of one image and some of the segments of another image to define overlapping segments; harmonizing the images based on at least one of brightness and color values within the overlapping segments to generate the top view of the area surrounding the vehicle; receiving sensor data generated from a plurality of proximity sensors, wherein the sensor data indicates a location of an object outside of the vehicle; associating a group of the overlapping segments with the location of the object; adjusting weights associated with the group of the overlapping segments; and harmonizing the images with the adjusted weights associated with the group of the overlapping segments.

In another embodiment a system for generating a top view of an area surrounding a vehicle is provided. The system includes a plurality of vehicle cameras, each vehicle camera configured to view a respective region outside of the vehicle, wherein portions of some of the regions overlap with portions of other regions to define overlapping regions. The system also includes a plurality of proximity sensors disposed about the vehicle. The system also includes at least one processor coupled to the vehicle cameras and the proximity sensors, wherein the at least one processor programmed to: receive images generated by the vehicle cameras; segment each image into a respective plurality of segments, wherein the overlapping regions include some of the segments of one image and some of the segments of another image to define overlapping segments; process sensor data generated by the proximity sensors to determine a location of an object outside of the vehicle; associate a group of the overlapping segments with the determined location of the object; adjust weights associated with the group of the overlapping segments that are associated with the determined location of the object; and harmonize the images based on at least one of brightness and color values within the overlapping segments to generate the top view of the area surrounding the vehicle, wherein the harmonizing of the images is further based on the adjusted weights.

In another embodiment, a method for harmonizing images based on proximity sensor data includes: receiving images from a plurality of vehicle cameras, wherein each vehicle camera is configured to view a respective region outside of a vehicle, and wherein a portion of each region overlaps with another portion of an adjacent region to define overlapping regions; segmenting the images into an associated plurality of segments, wherein the overlapping regions include some of the segments of one image and some of the segments of another image to define overlapping segments; receiving sensor data generated from a plurality of proximity sensors, wherein the sensor data indicates a location of an object outside of the vehicle; and harmonizing the images based on at least one of brightness and color values within the overlapping segments to generate a composite view of an area surrounding the vehicle, wherein the harmonizing is further based upon the sensor data.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As explained in the Background, automotive vehicles (e.g., cars, trucks, vans, SUVs, etc.) can be equipped with a camera system that generates a top view on the vehicle display (e.g., infotainment screen, dashboard unit, tablet, mobile device, phone, etc.). The top view, also referred to as a top-down view, an above view, or a bird's view, is generated by stitching together images from various cameras located about the vehicle. The images are processed, analyzed and stitched together to offer a synthetic but positionally accurate top view of the vehicle and its 360-degree surroundings; it appears to the driver as if a single image is taken of the vehicle and its surroundings from directly above the vehicle. This view can assist the driver with parking or slow-speed maneuvering in tight spaces.

These camera systems typically include four or more cameras about the vehicle, mounted at or near the front, the rear, and either side of the vehicle. Each camera can independently have its own image signal processing prior to the images being stitched together. Therefore, the cameras may have different exposure, contrast, brightness, and the like. Since each camera faces in a different direction and sees different surrounding areas of the vehicle, the brightness and color values can be slightly different for each camera. These differences in color (chrominance) and brightness (luminance) can negatively affect the top view. For example, if one camera has a brightness or color exposure that varies greatly from that of another camera, the composite top view may not be aesthetically pleasing due to a corresponding stark change in brightness or color at certain points of the composite top view.

Due to this, harmonization techniques are applied when generating the top view to harmonize the merged camera images with respect to brightness and color. Harmonization algorithms are commonly used in image processing to harmonize fused camera images for brightness or luminance and chrominance. In general, harmonization works to perform color and brightness transformation amongst the images of different cameras. The color and brightness statistics of the images, when forming a composite top view, can be averaged and matched. For example, zones of the histogram are predicted or determined which can be best matched between the two images, and then the color is adjusted for both of the images such that the color is consistent in the composite view. German Patent Publication No. DE102016121755 ("the '755 publication), titled Method For Determining A Composite Image Of A Surrounding Area Of A Motor Vehicle With Adaptation Of Brightness And/Or Color, Camera System And Power Vehicle, is incorporated by reference herein in its entirety. The '755 Publication describes a harmonization technique in which calculated histograms are used as inputs to generate correction values for each camera and each corresponding Y, U, and V channel. The harmonization can be particularly helpful in areas that are seen by two or more of the cameras (in other words, areas where the views from the vehicle cameras overlap). German Patent Publication No. DE102018110597 ("the '597 publication"), titled Method for Image Harmonization, Image Processing Device, Camera System and Motor Vehicle, is also incorporated by reference herein in its entirety. The '597 Publication described a harmonization technique in which a color analysis of regions of interests of multiple images is performed. A color correction value is determined depending on the color analysis, and is applied to part of the image so that the color of that image is adjusted.

However, the prior art systems do not account very well for objects that may appear in the field of view that can distort the color or brightness. For example, the vehicle may complete many different maneuvers, parking sessions, driving around parking spots, driving in and out of tunnels, etc., during which the vehicle camera system is exposed to a vast range of lighting environments and high dynamic scene content ranges. This can produce significant discrepancy of brightness and color in the objects that are seen by one or more of the cameras. Critical object scene content that the camera system needs to accurately reproduce under variable lighting environments includes grass areas, lighting conditions in a garage or tunnel, traffic cones, other vehicles, etc. If harmonization techniques are used that distort the appearance of these images, it may result in a generated top view that displays objects with a much different brightness or color that they actually look like to the human eye.

Therefore, according to various embodiments described herein, a vehicle camera system includes a harmonization processing technique (also referred to as a harmonization algorithm or a harmonization correction algorithm) that is able to detect that the vehicle is surrounded by a colored texture or strong color from an object. A main objective of the harmonization processing technique is to accurately reproduce the vehicle's surroundings, in which the harmonization corrects for brightness and color casts (in the absolute and relative camera sense) that originate from the camera's limitations (e.g., lens, image sensor, etc.), rather than for brightness and color casts that originate from an object in the camera's view.

Figure 1:
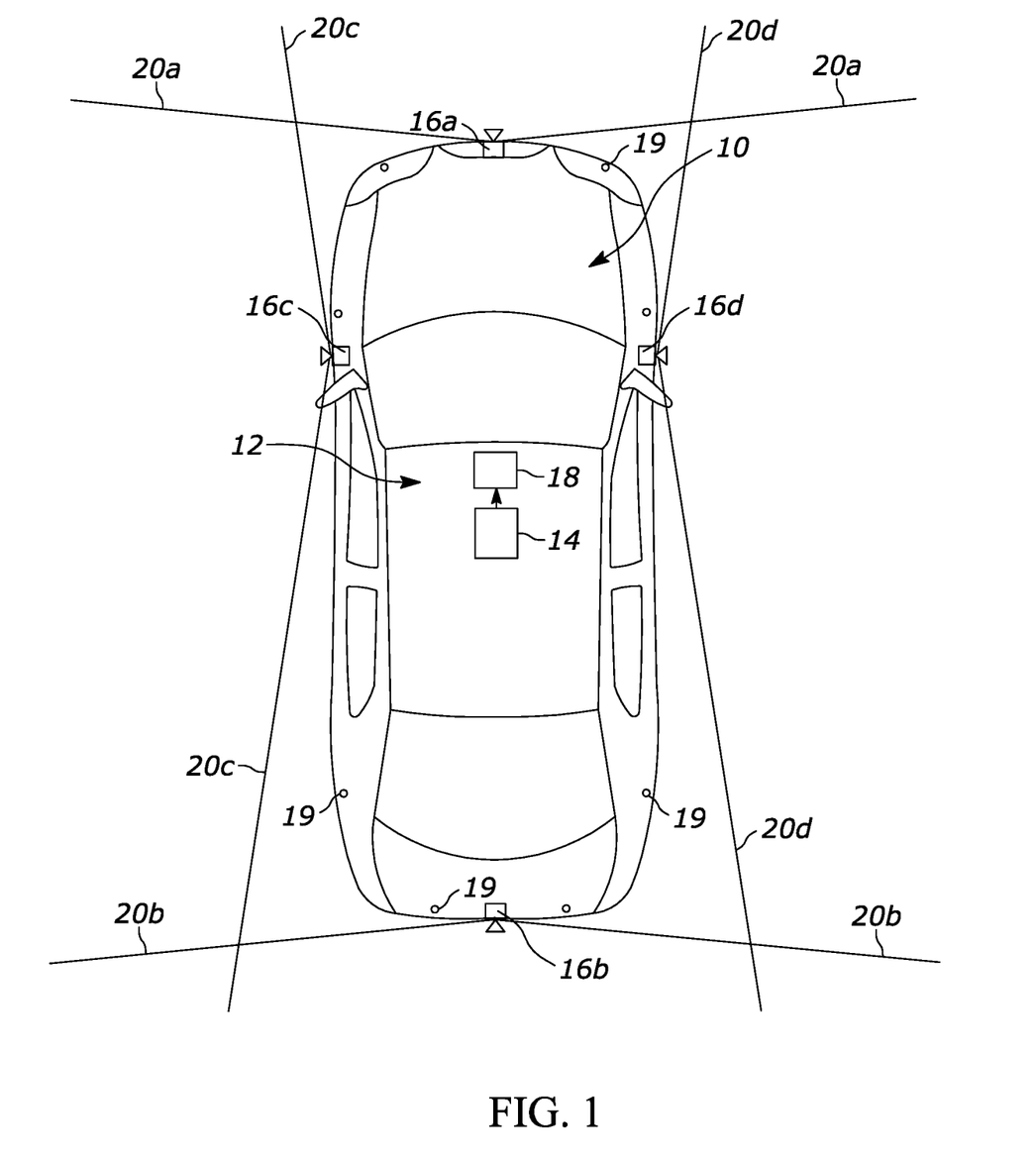
FIG. 1 illustrates a schematic of a vehicle according to an embodiment with various cameras and proximity sensors.

FIG. 1 illustrates a schematic of a vehicle 10 according to an embodiment, shown here from a top view. The vehicle 10 is a passenger car, but can be other types of vehicles such as a truck, van, or sports utility vehicle (SUV), or the like. The vehicle 10 includes a camera system 12 which includes an electronic control unit (ECU) 14 connected to a plurality of cameras 16a, 16b, 16c, and 16d. In general, the ECU 14 includes one or more processors programmed to process the images data associated with the cameras 16a-d and generate a composite top view on a vehicle display 18. In addition, as will be described further below, the vehicle 10 includes a plurality of proximity sensors (e.g., ultrasonic sensors, radar, sonar, LiDAR, etc.) 19. The proximity sensors 19 can be connected to their own designated ECU that develops a sensor map of objects external to the vehicle. Alternatively, the proximity sensors can be connected to ECU 14.

The ECUs disclosed herein may more generally be referred to as a controller. In the case of an ECU of a camera system 12, the ECU can be capable of receiving image data from the various cameras (or their respective processors), processing the information, and outputting instructions to combine the image data in generating a composite top view, for example. In the case of an ECU associated with the proximity sensors 19, the ECU can be capable of receiving sensor data from the various proximity sensors (or their respective processors), processing the information, and outputting a sensor map of objects surrounding the vehicle; this ECU can also be capable of causing alerts to be sent to the driver during parking maneuvers that might warn the driver of the proximity of the detected objects. In this disclosure, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller and systems described herein. In one example, the controller may include a processor, memory, and non-volatile storage. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The memory may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information. The processor may be configured to read into memory and execute computer-executable instructions embodying one or more software programs residing in the non-volatile storage. Programs residing in the non-volatile storage may include or be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The computer-executable instructions of the programs may be configured to, upon execution by the processor, cause the harmonization techniques and algorithms described herein.

In the embodiment illustrated in FIG. 1, the cameras 16-d are located about different quadrants of the vehicle, although more than four cameras may be provided in the camera system 12. Each camera 16a-d may have a fish-eye lens to obtain images with an enlarged field of view, indicated by boundary lines 20a-d. In an example, a first camera 16a faces an area in front of the vehicle, and captures images with a field of view indicated by boundary lines 20a. The first camera 16a can therefore be referred to as the front camera. A second camera 16b faces an area behind the vehicle, and captures images with a field of view indicated by boundary lines 20b. The second camera 16b can therefore be referred to as the rear camera. A third camera 16c faces an area on the left side of the vehicle, and captures images with a field of view indicated by boundary lines 20c. The third camera 16c can therefore be referred to as the left camera, or left-side camera. The third camera 16c can also be mounted on or near the vehicle's left wing mirror, and can therefore be referred to as a mirror left (ML) camera. A fourth camera 16d faces an area on the right side of the vehicle, and captures images with a field of view indicated by boundary lines 20d. The fourth camera 16d can therefore be referred to as the right camera, or right-side camera. The fourth camera 16d can also be mounted on or near the vehicle's right wing mirror, and can therefore be referred to as a mirror right (MR) camera. The images (or the associated image data) originating from the cameras 16a-d can be processed by the ECU 14 (e.g., stitched together, distorted, combined, and harmonized) to generate the composite top view on the vehicle display 18.

Figure 2:
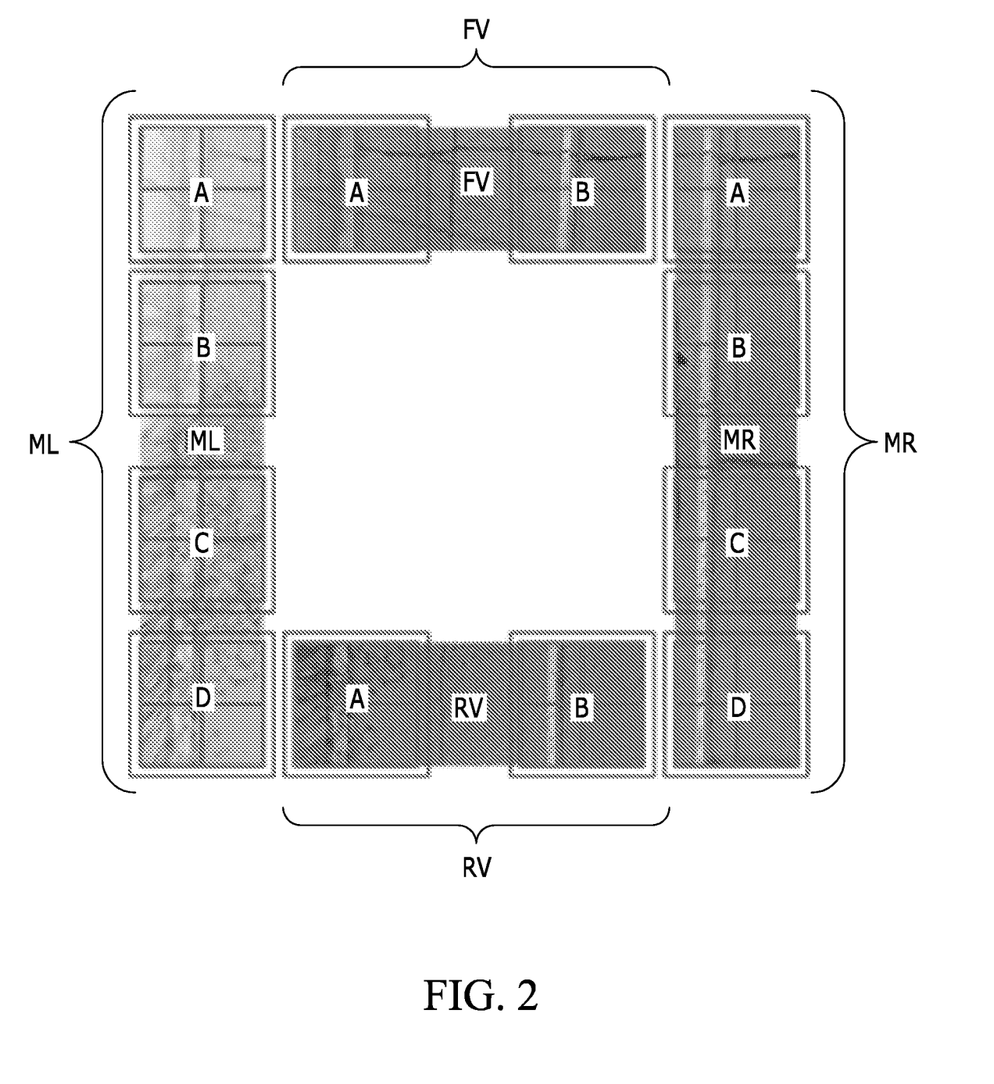
FIG. 2 illustrates a schematic representation of image areas captured by the various vehicle cameras, according to an embodiment.

FIG. 2 shows a schematic representation of image areas captured by the various cameras 16a-d. Here, images areas associated with each of the cameras 16a-d are as follows: the front camera 16a produces an image of a front view (FV) area; the rear camera 16b produces an image of a rear view (RV) area; the left-side camera 16c, or mirror left camera, produces an image (ML) of a left side view area; the right-side camera 16d, or mirror right camera, produces an image (MR) of a right side view area.

In addition, the image areas FV, RV, ML, MR are divided into several respective regions of interest (ROIs). These regions of interest can be fixed and set per camera. The images from each of the front and rear cameras 16a-b can be divided into two ROIs, such as FV-A, FV-B, RV-A and RV-B. The images from each of the side cameras 16c-d can be divided into four ROIs such as ML-A, ML-B, ML-C, ML-D, MR-A, MR-B, MR-C, and MR-D. The number of ROIs can be more or less than the number shown in FIG. 2, and can be arbitrary and depend, for example, on the texture size and its relative proportion to the image size of the other cameras. For example, to create a spherical view, the number of ROIs can be different than those illustrated here.

Some of these regions of interest overlap. Note how in FIG. 1, the boundary lines 20a-d intersect at various portions. This indicates that a certain portion of each camera's field of view overlaps with a portion of another camera's field of view. This is also shown in FIG. 2. For example, the regions of interest FV-A and ML-A overlap. In other words, an area of the environment outside of the vehicle seen by the left-side camera 16c as shown in area ML-A is also seen by the front camera 16a as shown in area FV-A. This can be seen in FIG. 2, where the scene of the environment that can be seen in area ML-A is the same as the scene of the environment that can be seen in area FV-A. The same overlap occurs between areas FV-B and MR-A, and between areas RV-B and MR-D, and between areas RV-A and ML-D.

In contrast, some ROIs may not overlap. For example, the scene depicted in areas ML-B, ML-C, MR-B, and MR-C do not overlap with any view from any other camera.

Image harmonization compares the brightness and color components of the same scene content, i.e., in overlapping regions of interest. In these overlapping ROIs, the scene content is the same but the brightness and color of this content can appear different between the different cameras. For example, the scene content shown in region ML-A may be brighter than the same scene content shown in region FV-A. This is due to each camera adjusting parameters (e.g., via its own designated processor) to try and accurately reproduce the entire scene it sees. For example, the front camera 12a might be positioned more towards the sky and see a bright sun in its view, for which it reduces its exposure time accordingly so as to not have an oversaturated image. On the other hand, the left-side camera 16c might be positioned so that it sees mostly a dark ground and increases its exposure accordingly to be able to receive enough light to reproduce the scene. The brightness and color components of each overlapping ROI are analyzed and compared by two or more cameras in the harmonization algorithm. The harmonization algorithm attempts to match the brightness and color components of the overlapping regions of interest (e.g., FV-A and ML-A) to harmonize the image. The image harmonization described herein may be performed by the ECU 14, for example.

To improve the robustness of the image harmonization, each region of interest (e.g., FV-A, FV-B, ML-A, ML-B, ML-C, etc.) can be divided further into sub-regions, also referred to as micro blocks or segments. This is shown in FIG. 2, where each area of interest is divided into four sub-regions of interests, or micro blocks. Of course, the number of micro blocks per area of interest need not be four, need not be identical in number or shape or size amongst the areas of interest, and can take the shape or number to fit a particular application. But here, each micro block is represented as a square for simplicity. The image harmonization can be configured to compute or estimate the brightness (luminance) and color (chrominance) for each micro block in each overlapping ROI. This can yield a Y, U, and V estimation value for each micro block. The image harmonization can then adjust the images produced by the cameras so that the brightness and color in the micro blocks in each overlapping ROI matches or is more aligned.

Figure 3:
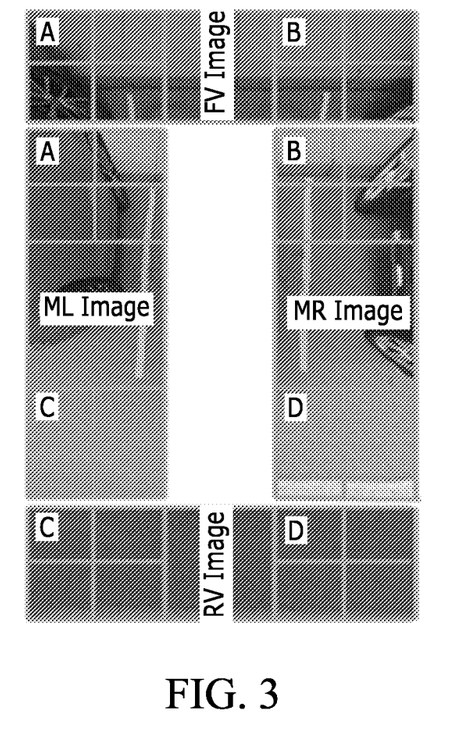
FIG. 3 illustrates another schematic representation of image areas captured by the various vehicle cameras, according to an embodiment.

As mentioned before, such matching is expected to be relatively reliable in cases where there are no objects in the field of view. However, sometimes objects in the surrounding environment are positioned in these overlapping regions of interest. When camera images of such objects is acquired from different view positions, the overlapping regions of interest will no longer necessarily have the same scene content due to different camera perspectives of the objects. This is exemplified in FIG. 3, for example. FIG. 3 illustrates another schematic representation of image areas captured by the various cameras 16a-d, producing a FV image, a RV image, a ML image, and a MR image. As can be seen in FIG. 3, in the top left corner, an object (in this case, a red vehicle) is positioned in the overlapping region of interest between the front view camera (FV) and the left camera (ML) images. The scene content is not identical in this overlapping region of interest, labeled "A". When the scene content is not the same, it can introduce ambiguity into the image matching approach of harmonization. The micro blocks helps solve this issue, comparing the micro block of each region of interest to a corresponding micro block of an overlapping region of interest. However, in cases where an object in the overlapping area is covering a significant amount of space, this approach may not be reliable. Therefore, according to various embodiments disclosed herein, the camera system is able to adjust its harmonization techniques based on the presence of a detected object. As will be explained, when an object is detected as being present in one of these overlapping regions of interest, the camera system can ignore, exclude, or down-weight the influence of these regions of interest (or sub-regions) in the harmonization process.

According to an embodiment, the micro blocks are weighted with a confidence score or level of compatibility with its corresponding region of interest (e.g., in the case of FIG. 3, regions of interest ML-A and FV-A, which is where the object is detected). The confidence score is based on the extent the object content is present in the overlapping ROI micro blocks. If there are no objects present, then the corresponding overlapping micro blocks will be weighted the same (e.g., because they have the same or very similar scene content). However, in some cases, objects are detected in those ROIs, then the overlapping regions ROIs will not be of the same scene content due to the perspective projection of each camera. And in other cases, the object can be present in only a small portion of the micro blocks; based on that knowledge, the system can assign a confidence number (e.g., between 0 and 1) to each of the micro blocks in that ROI.

Figure 4:
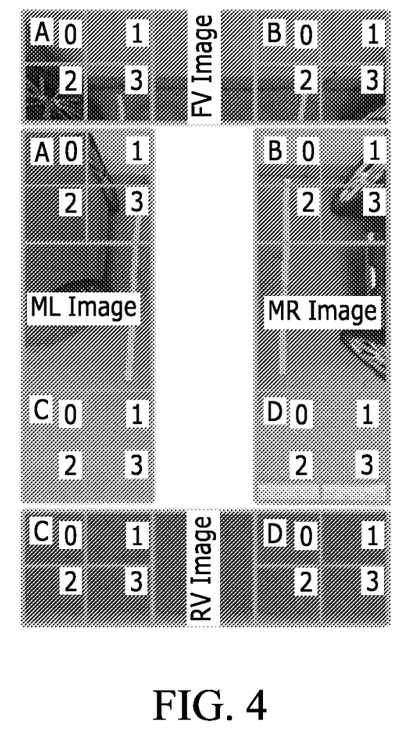
FIG. 4 illustrates the schematic of FIG. 3 with labeled micro blocks.

FIG. 4 exemplifies this. Here, numeric notations are assigned to each micro block (e.g., 0, 1, 2, or 3). Of course, if more micro blocks are present in each ROI, then more numeric notations can be provided. In this scenario with the object (e.g., red vehicle), the micro blocks labeled 0 and 2 of the region ML-A are almost entirely filled with the body of the red vehicle. Also, the corresponding micro blocks 0 and 2 of region FV-A are of different scene content due to the object being present.

In situations like this, the system can rely on objects detected by one or more of the proximity sensors 19. In general, the ECU 14 can modify its harmonization algorithms based on the presence of a detected object in an area that corresponds with an overlapping ROI. For example, the ECU 14 can receive sensor data generated from one or more of the proximity sensors indicating the presence of an object external to the vehicle, determine that the object is located in a region corresponding to overlapping ROIs in the camera system (e.g., FV-A and ML-A), and adjust harmonization weights associated the micro blocks where that object is detected.

Figure 5:
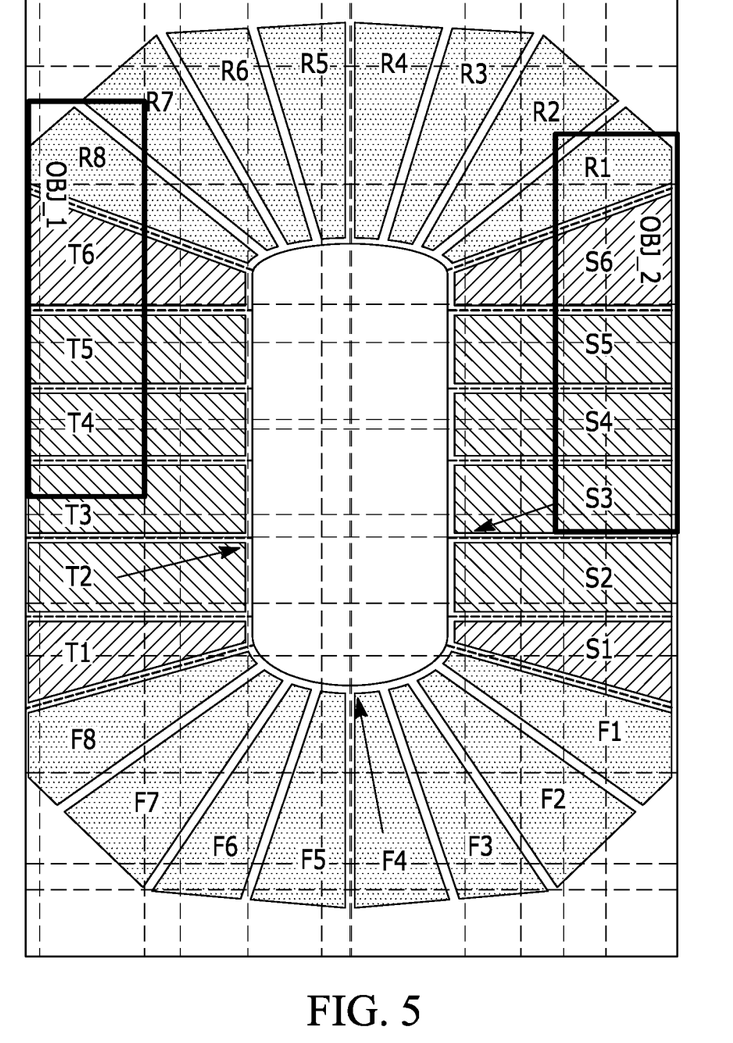
FIG. 5 illustrates a two-dimensional (2D) obstacle map generated based on data from proximity sensors, according to an embodiment.

In one embodiment, to determine whether a detected object is in a location corresponding to the overlapping ROIs, the ECU 14 (or other vehicle ECU) can rely on an obstacle map that is generated by the sensor data originating from the proximity sensors. An example of a generated obstacle map is shown in FIG. 5. In general, the obstacle map translates the proximity sensor data into a two-dimensional (2D) map that indicates a location of a detected object. In the example shown in FIG. 5, 28 proximity sensors are provided about the vehicle, labeled R1-R8, S1-S6, T1-T6, and F1-F8. Of course, the number of proximity sensors can be more or less than 28. If an object has been detected by at least some of the proximity sensors (e.g., in this case R7-R8, T3-T6), the 2D obstacle map generated by the ECU visualizes the presence of the object as "OBJ_1". If another object has been detected by at least some of the proximity sensors (e.g., in this case R1-R2, S3-S6), the 2D obstacle map generated by the ECU visualizes the presence of the object as "OBJ_2".

This information can be overlaid or otherwise associated with the image data of the environment surrounding the vehicle. With the image data from the cameras 16a-d, the system can calculate the positions of the regions of interest and the micro blocks in the image data that correspond to various coordinates of the 2D obstacle map generated by the proximity sensors relative to the vehicle. This can be done once within a calibration procedure, coordinating the 2D obstacle map and the surround view multi-camera textures using the positions of the cameras and the viewport parameters. For example, the 2D obstacle map can provide the system with the two-dimensional coordinates (e.g., X and Y) of the area about the vehicle and any detected objects therein. These coordinates can correspond to the micro blocks explained with respect to FIG. 4. When an object appears in the 2D obstacle map, the ECU is able to know precisely which micro blocks are associated with the location of the object, thus enabling the ECU to determine which micro blocks have an object present in them.

Figure 6:
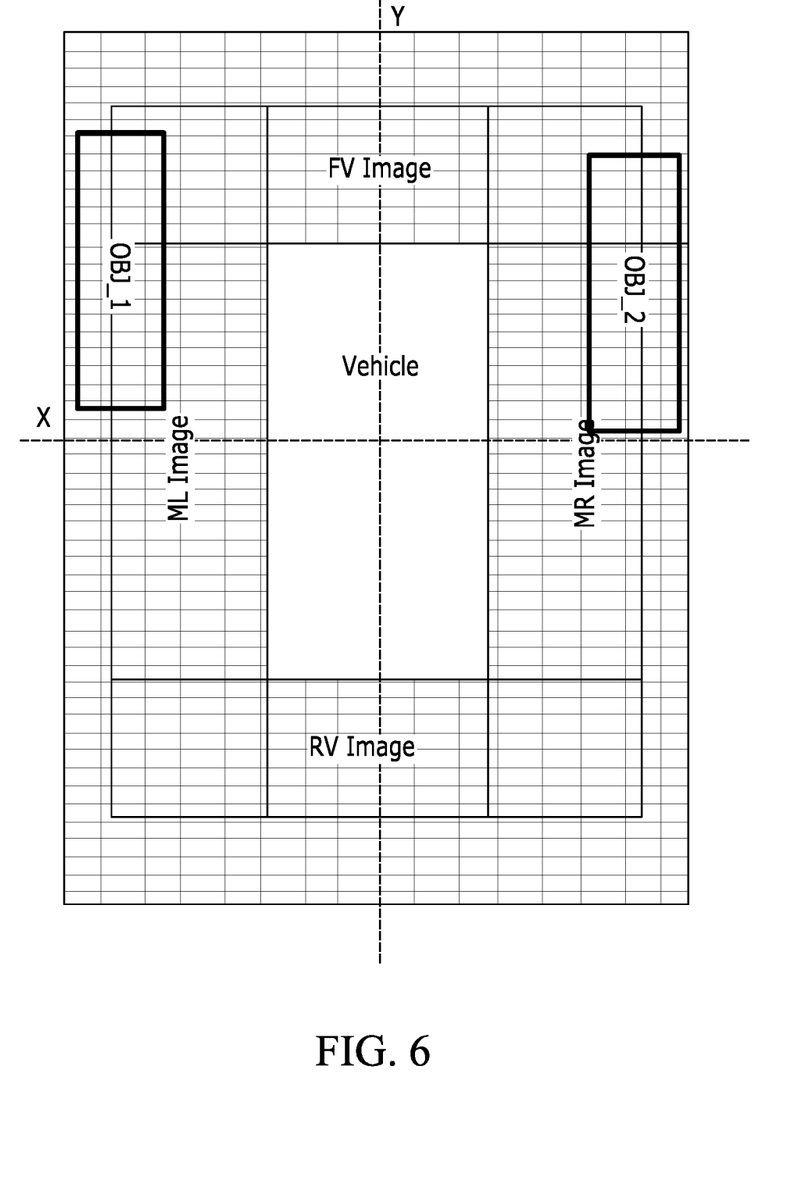
FIG. 6 illustrates a schematic of image areas having micro blocks associated with the detected location of the objects based on the 2D obstacle map, according to an embodiment.

The result of this association is shown in FIG. 6, according to an embodiment. FIG. 6 illustrates a schematic similar to FIG. 4 in which the views seen by the vehicle cameras 16a-d are placed in a composite, with micro blocks as part of various regions of interest. In this embodiment, there are more micro blocks than were shown in FIG. 4, but again this is merely an example. As can be seen, the object detected by the proximity sensors in FIG. 5 ("OBJ_1") is now shown on the composite micro block map of FIG. 6. Some micro blocks that overlap both the FV Image region and the ML Image region have the object present. Another object ("OBJ_2") detected by the proximity sensors is also shown in the 2D obstacle map of FIG. 5, and translated to a plurality of micro blocks in FIG. 6.

Figure 7:
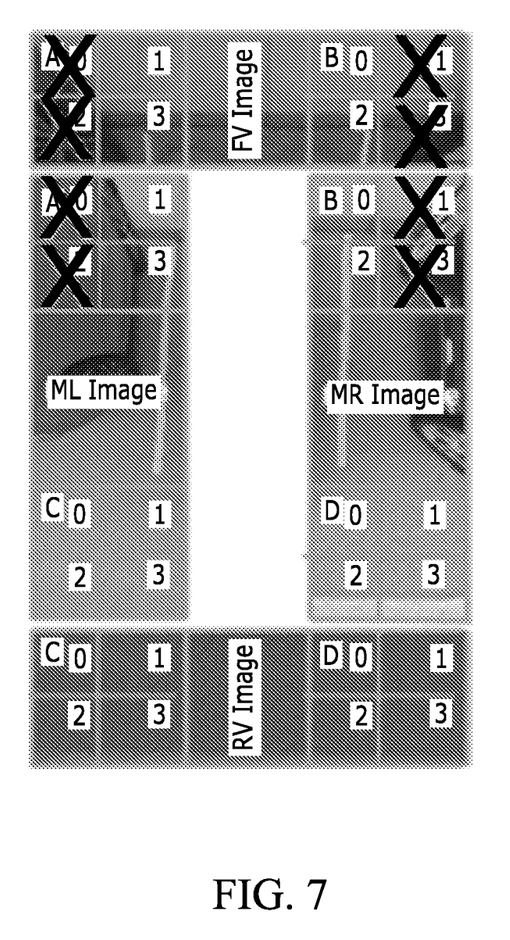
FIG. 7 is the schematic of FIG. 4, with flags or marks (indicated with an X) associated with some of the micro blocks that are associated with the detected location of the object, according to an embodiment.

With this information, certain micro blocks can then be weighted or removed from the harmonization algorithm. This can be done by applying a weighting factor to reduce the influence of micro blocks based on the detected object's position/location, and the associated confidence scores. FIG. 7 illustrates an "X" placed in a group of micro blocks in which objects are detected in overlapping ROIs. This group of micro blocks can be referred to as flagged or tagged micro blocks. For example, micro blocks 0 and 2 of FV-A and ML-A are flagged. These flagged micro blocks can be weighted less in, or removed from, the harmonization algorithms. Micro blocks in the MR-B region of interest are also marked or flagged, namely boxes 1 and 3 from MR-B The corresponding overlapping boxes 1 and 3 from FV-B are also flagged, as they are sampling in the area where the obstacle has been detected via the 2D obstacle map.

Once the micro blocks with the detected object appearing in them are marked or flagged, several approaches can be used in the harmonization algorithms. In one embodiment, the brightness and color matching in the harmonization algorithm can ignore these flagged micro blocks. That way, the brightness and color appearing in these micro blocks will not influence the harmonization algorithm. This results in a smoother, more natural looking composite top view especially in regions that transition from views seen by one camera to views seen by another camera.

The exclusion of these flagged micro blocks may be done in a binary way; micro blocks that are flagged can be excluded, while micro blocks that are not flagged are not excluded from the harmonization. In another embodiment, the flagged micro blocks are not excluded entirely but are rather weighted. Confidence scores can be used to define to which extent the system will use each particular micro block for final estimation of the correction of brightness and color in the harmonization. The weights could also be between 0 and 1 depending on how much of the micro block the object is taking up. For example, if the object is taking up 75% of the micro block, the weight could be 0.75. The assigned weight may also be 0 (such that it is removed entirely from the harmonization algorithm) or 1 (such that it is fully involved in the harmonization algorithm with no damper).

As explained above, the harmonization algorithms implemented by the ECU may be designed to average color and brightness amongst portions of the images for consistency and smoothness in the composite image. The harmonization algorithm may provide estimation values (Y, U and V) for each pixel component for each micro block of each region of interest of each camera. With the weighting factors now determined from the 2D obstacle map, the system can multiply the estimation values for Y, U and V of each of the micro blocks. In other words, the Y, U, and V values of each micro block of each overlapping ROI can be multiplied by the respective weight assigned to that micro block.

To summarize embodiments disclosed herein, the systems disclosed herein can improve harmonization algorithms for top views of vehicles. First, the system obtains coordinates (X and Y) of one or more micro blocks for a particular region of interest in the real world relative to the vehicle. The system obtains a 2D obstacle map from the vehicle's ultrasonic sensor data. The 2D obstacle data is segmented, and each micro block is associated with a corresponding segment of the obstacle data. Each micro block can be assigned a weighting factor based on whether the object is present or not, or how much the object is present. Then, each estimation value of the micro blocks is multiplied by the corresponding weighting factor of that micro block for the harmonization analysis.

Figure 8:
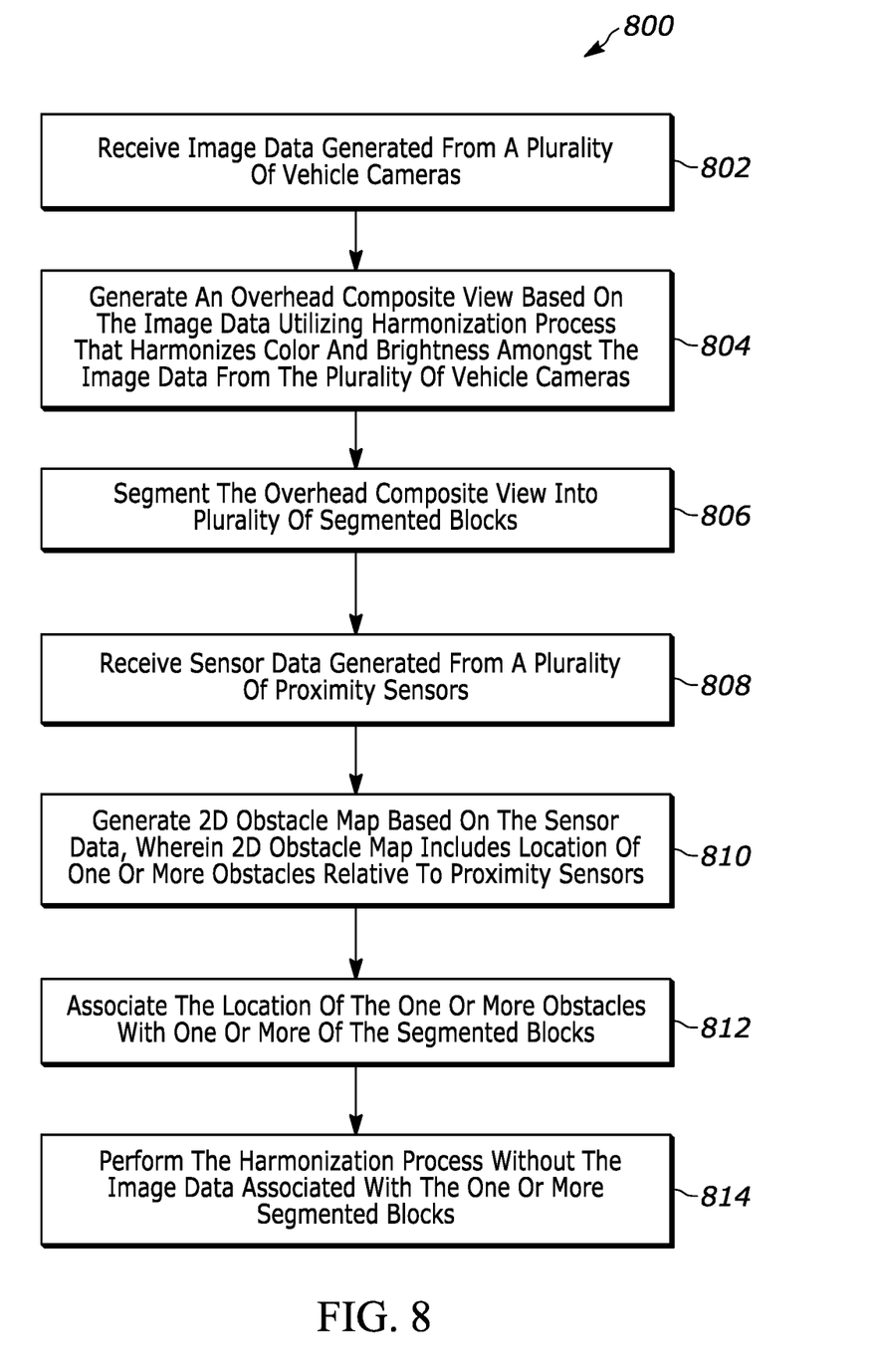
FIG. 8 illustrates an example of a flow chart of a method of harmonizing images based on the detected location of the object, according to an embodiment.

FIG. 8 illustrates an example of a flow chart 800 of a method or process that can be implemented by the one or more ECUs or processors described herein. For example, these steps may be stored in memory so that, when acted upon by a processor, cause the processor to perform these steps. In some alternative implementations, the functions noted in the flow chart blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flow chart illustration, and combinations of blocks in the block diagrams and/or flow chart illustration, can be implemented by special purpose hardware-based systems that perform the specified functions or acts or carry out combinations of special purpose hardware and computer instructions.

At 802, the processor receives image data generated from a plurality of vehicle cameras. For example, the processor in the ECU 14 can receive image data from the vehicle cameras 16*a-d*. With that image data, at 804 the ECU 14 generates an overhead composite view utilizing harmonization algorithms described above. The harmonization algorithms harmonize the color and brightness amongst the image data from the various vehicle cameras. This helps to improve the appearance of the composite image, especially in areas of the composite image that are generated from image data in overlapping regions from two cameras. At 806, the overhead composite view is segmented into a plurality of segmented blocks, or micro blocks. Various overlapping regions of interest (ROIs) exist such that micro blocks of a first camera image correspond to micro blocks of a second camera image that overlaps with the first camera image.

At 808, the processor receives sensor data generated from a plurality of proximity sensors. For example, the processor in the ECU 14 can receive sensor data from the various proximity sensors 19. At 810, a two dimensional (2D) obstacle map is generated based on the sensor data. This 2D obstacle map includes locations of one or more detected objects relative to the proximity sensors. In an embodiment, the 2D obstacle map is segmented, and various segments of the map are flagged or marked as areas in which the proximity sensors have detected an object.

At 812, the processor associates the location of the one or more obstacles with one or more of the segmented blocks. In doing so, various segments of the 2D obstacle map can correspond to a physical location of segmented blocks that the cameras can see. As an example, various regions of the 2D obstacle map that detect an object are associated with a plurality of micro blocks of FIG. 6 that represent portions of the surroundings that the vehicle cameras can see. With this association, at 814 the processor performs the harmonization process without the image data associated with the one or more associated segmented blocks. This removes the image data of those micro blocks from the harmonization process. In another embodiment, those micro blocks are weighted instead of being removed completely from the harmonization process.

Figure 9A:
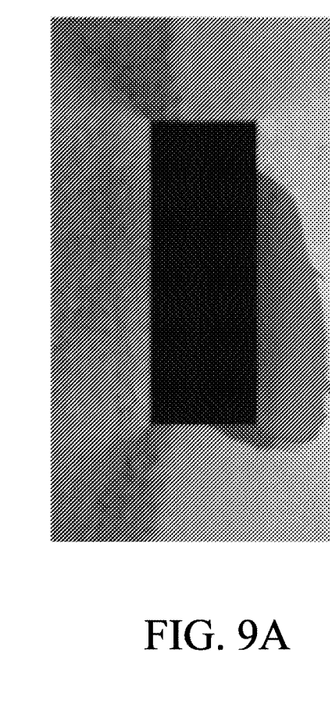
FIG. 9A shows a top view of a vehicle without implementing the harmonization disclosed herein.
Figure 9B:
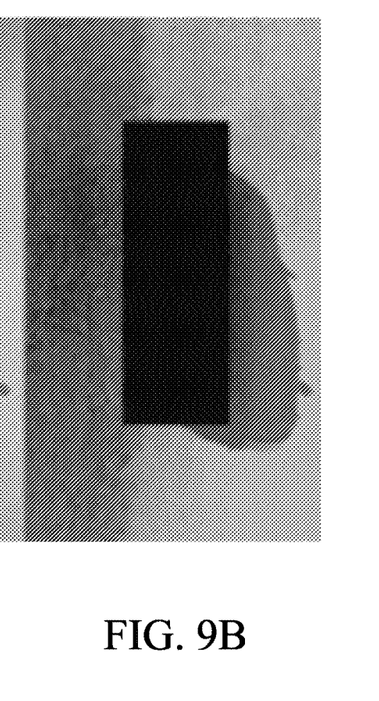
FIG. 9B shows the same view with implementing the harmonization.

FIG. 9A shows a top view of a vehicle without implementing the harmonization techniques disclosed herein. To the left of the vehicle is a large patch of green grass. This causes the exposure of the left-side camera (e.g., camera 16c) to adjust, thereby making the left-hand area of the top view brighter compared to the rest of the image. The same occurs on the right-hand side of the vehicle. Thus, the areas in front of and behind the vehicle appear darker than the areas to the sides of the vehicle. This can be unpleasant to the driver of the vehicle, and not a true representation of the environmental surroundings of the vehicle. FIG. 9B shows a top view of the vehicle implementing the harmonization techniques disclosed herein. A much smoother transition of shading and color is present amongst the various vehicle cameras that are stitched together to form the top view.

Figure 10A:
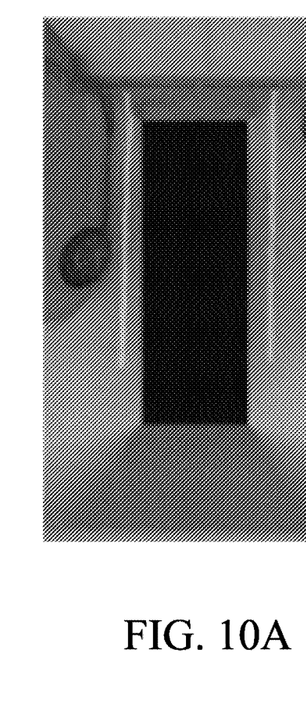
FIG. 10A shows another top view of a vehicle without implementing the harmonization disclosed herein.
Figure 10B:
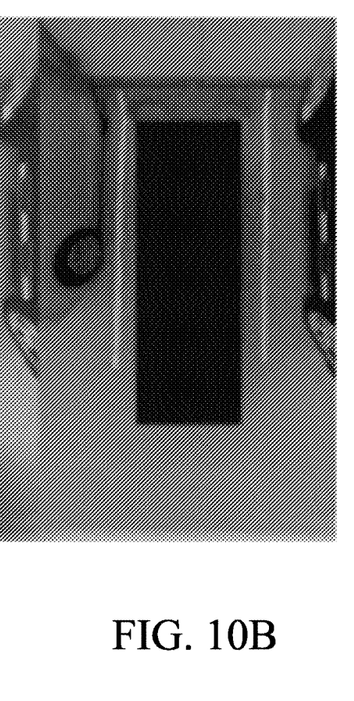
FIG. 10B shows the same view with implementing the harmonization.

FIG. 10A shows another top view of a vehicle without implementing the harmonization techniques disclosed herein. A red vehicle is located to the left of the vehicle, and a dark black vehicle is located to the right of the vehicle. This causes the exposure of the side cameras (e.g., cameras 16c, 16d) to adjust, thereby making the left-hand and right-hand areas of the top view appear brighter compared to the areas in front of and behind the vehicle. FIG. 10B shows a top view of the vehicle implementing the harmonization techniques disclosed herein. Once again, a much smoother transition of shading and color is present amongst the various vehicle cameras that are stitched together to form the top view.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, e.g., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC"). Such a special purpose circuit may be referred to as a computer processor even if it is not a general-purpose processor.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for generating a top view of an area surrounding a vehicle, the method comprising:
   receiving images from a plurality of vehicle cameras, wherein each vehicle camera is configured to view a respective region outside of the vehicle, and wherein portions of some of the regions overlap with portions of other regions to define overlapping regions;
   segmenting each image into a respective plurality of segments, wherein the overlapping regions include some of the segments of one image and some of the segments of another image to define overlapping segments;
   harmonizing the images based on at least one of brightness and color values within the overlapping segments to generate the top view of the area surrounding the vehicle;
   receiving sensor data generated from a plurality of proximity sensors, wherein the sensor data indicates a location of an object outside of the vehicle;
   associating a group of the overlapping segments with the location of the object;
   adjusting weights associated with the group of the overlapping segments; and
   harmonizing the images with the adjusted weights associated with the group of the overlapping segments.

2. The method of claim 1, wherein the harmonizing the images with the adjusted weights includes removing the brightness and color values associated with the group of the overlapping segments.

3. The method of claim 1, wherein the adjusting weights is based on an extent the object is present in the group of the overlapping segments.

4. The method of claim 1, wherein the proximity sensors are ultrasonic sensors mounted at various locations about the vehicle.

5. The method of claim 1, further comprising:
generating a 2D obstacle map based on the sensor data, wherein the 2D obstacle map provides the location of the object, and wherein the associating includes associating the group of the overlapping segments with segments of the 2D obstacle map associated with the location of the object.

6. The method of claim 1, further comprising displaying the top view on a vehicle display, wherein the top view includes the harmonized images with the adjusted weights associated with the group of the overlapping segments.

7. A system for generating a top view of an area surrounding a vehicle, the system comprising:
a plurality of vehicle cameras, each vehicle camera configured to view a respective region outside of the vehicle, wherein portions of some of the regions overlap with portions of other regions to define overlapping regions;
a plurality of proximity sensors disposed about the vehicle; and
at least one processor coupled to the vehicle cameras and the proximity sensors, the at least one processor programmed to:
receive images generated by the vehicle cameras,
segment each image into a respective plurality of segments, wherein the overlapping regions include some of the segments of one image and some of the segments of another image to define overlapping segments,
process sensor data generated by the proximity sensors to determine a location of an object outside of the vehicle,
associate a group of the overlapping segments with the determined location of the object,
adjust weights associated with the group of the overlapping segments that are associated with the determined location of the object, and
harmonize the images based on at least one of brightness and color values within the overlapping segments to generate the top view of the area surrounding the vehicle, wherein the harmonizing of the images is further based on the adjusted weights.

8. The system of claim 7, wherein the at least one processor is further programmed to:
harmonize the images again without taking into account either the brightness or color values associated with the overlapping segments.

9. The system of claim 7, wherein the weights are adjusted based on an extent the object is present in the group of the overlapping segments.

10. The system of claim 7, wherein the proximity sensors are ultrasonic sensors.

11. The system of claim 7, wherein the at least one processor is further programmed to:
generate a 2D obstacle map based on the sensor data, wherein the 2D obstacle map provides the location of the object, and associate the group of the overlapping segments with segments of the 2D obstacle map associated with the location of the object.

12. The system of claim 7, wherein the at least one processor is further programmed to:
display the top view on a vehicle display, wherein the top view includes the harmonized images with the adjusted weights associated with the group of the overlapping segments.

13. A method for harmonizing images based on proximity sensor data, the method comprising:
receiving images from a plurality of vehicle cameras, wherein each vehicle camera is configured to view a respective region outside of a vehicle, and wherein a portion of each region overlaps with another portion of an adjacent region to define overlapping regions;
segmenting the images into an associated plurality of segments, wherein the overlapping regions include some of the segments of one image and some of the segments of another image to define overlapping segments;
receiving sensor data generated from a plurality of proximity sensors, wherein the sensor data indicates a location of an object outside of the vehicle; and
harmonizing the images based on at least one of brightness and color values within the overlapping segments to generate a composite view of an area surrounding the vehicle, wherein the harmonizing is further based upon the sensor data.

14. The method of claim 13, further comprising:
associating a group of the overlapping segments with the location of the object.

15. The method of claim 14, wherein the harmonizing includes adjusting weights associated with the at least one of brightness and color values of the group of the overlapping segments.

16. The method of claim 15, wherein the adjusting of weights is based on an extent the object is present in the group of the overlapping segments.

17. The method of claim 14, wherein the harmonizing is based upon the at least one of the brightness and color values associated with the overlapping segments excluding the group of the overlapping segments.

18. The method of claim 14, further comprising:
generating a 2D obstacle map based on the sensor data, wherein the 2D obstacle map includes segments corresponding to the location of the object, and wherein the associating includes associating the group of the overlapping segments with the segments of the 2D obstacle map that correspond to the location of the object.

19. The method of claim 13, further comprising:
displaying the composite view on a vehicle display.

20. The method of claim 19, wherein the composite view is a top view of the area surrounding the vehicle.

* * * * *